(12) United States Patent
Nammi et al.

(10) Patent No.: US 10,644,924 B2
(45) Date of Patent: May 5, 2020

(54) FACILITATING A TWO-STAGE DOWNLINK CONTROL CHANNEL IN A WIRELESS COMMUNICATION SYSTEM

(71) Applicant: AT&T Intellectual Property I, L.P., Atlanta, GA (US)

(72) Inventors: SaiRamesh Nammi, Austin, TX (US); Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 25 days.

(21) Appl. No.: 15/340,744

(22) Filed: Nov. 1, 2016

(65) Prior Publication Data

US 2018/0092068 A1 Mar. 29, 2018

Related U.S. Application Data

(60) Provisional application No. 62/401,867, filed on Sep. 29, 2016.

(51) Int. Cl.
*H04L 1/00* (2006.01)
*H04L 27/34* (2006.01)

(52) U.S. Cl.
CPC .............. *H04L 27/34* (2013.01); *H04L 1/001* (2013.01); *H04L 1/0003* (2013.01); *H04L 1/0004* (2013.01); *H04L 1/0025* (2013.01)

(58) Field of Classification Search
CPC . H04W 24/00; H04W 72/042; H04W 72/046; H04W 72/0446; H04L 1/001;
(Continued)

(56) References Cited

U.S. PATENT DOCUMENTS 7,002,949 B2 2/2006 Garcia-Luna-Aceves et al.
7,020,110 B2 3/2006 Walton et al.
(Continued)

FOREIGN PATENT DOCUMENTS

CN 1627849 A 6/2005
CN 101631355 A 1/2010
(Continued)

OTHER PUBLICATIONS

International Search Report and Written Opinion for Application No. PCT/US2017/052582, dated Dec. 6, 2017, 16 pages.
(Continued)

*Primary Examiner* — Michael Thier
*Assistant Examiner* — Prince A Mensah
(74) *Attorney, Agent, or Firm* — Amin, Turocy & Watson, LLP

(57) ABSTRACT

A two-stage downlink control channel is provided for a wireless communication system. In one example, an apparatus comprises a processor, and a memory that stores executable instructions that, when executed by the processor, facilitate performance of operations. The operation can comprise: transmitting a first portion of a downlink control channel to a mobile device according to a first specification of parameters; and transmitting a second portion of the downlink control channel to the mobile device according to a second specification of the parameters, wherein the second specification of the parameters is adaptively determined based on a condition of an environment in which the first portion of the downlink control channel is transmitted and wherein the second portion is dictated by the first specification of parameters.

20 Claims, 11 Drawing Sheets

(58) Field of Classification Search
CPC ... H04L 1/0003; H04L 1/0004; H04L 1/0025; H04L 27/34
See application file for complete search history.

(56) References Cited

U.S. PATENT DOCUMENTS

| | | | |
|---|---|---|---|
| 7,209,443 B2 | 4/2007 | Mukai et al. |
| 7,260,366 B2 | 8/2007 | Lee et al. |
| 7,551,546 B2 | 6/2009 | Ma et al. |
| 7,636,573 B2 | 12/2009 | Walton et al. |
| 7,698,463 B2 | 4/2010 | Ogier et al. |
| 7,877,067 B2 | 1/2011 | Hwang et al. |
| 7,907,512 B1 | 3/2011 | Von der Embse |
| 8,018,889 B2 | 9/2011 | Lim et al. |
| 8,040,844 B2 | 10/2011 | Olexa et al. |
| 8,055,269 B2 | 11/2011 | Feher |
| 8,102,794 B2 | 1/2012 | Shin et al. |
| 8,159,399 B2 | 4/2012 | Dorsey et al. |
| 8,165,536 B2 | 4/2012 | Sekiya et al. |
| 8,189,577 B2 | 5/2012 | Vaswani et al. |
| 8,218,550 B2 | 7/2012 | Axelsson et al. |
| 8,271,043 B2 | 9/2012 | Kim et al. |
| 8,300,555 B2 | 10/2012 | Horn et al. |
| 8,306,525 B2 | 11/2012 | Feher |
| 8,423,068 B2 | 4/2013 | Tiwari et al. |
| 8,509,060 B1 | 8/2013 | Dong et al. |
| 8,537,658 B2 | 9/2013 | Sayana et al. |
| 8,537,714 B2 | 9/2013 | Liu |
| 8,553,560 B2 | 10/2013 | Axelsson et al. |
| 8,578,054 B2 | 11/2013 | Thubert et al. |
| 8,665,797 B2 | 3/2014 | Ding et al. |
| 8,681,747 B2 | 3/2014 | Dateki et al. |
| 8,711,716 B2 | 4/2014 | Chen et al. |
| 8,761,834 B2 | 6/2014 | Luz et al. |
| 8,774,154 B2 | 7/2014 | Bui |
| 8,787,257 B2 | 7/2014 | Fujita |
| 8,798,011 B2 | 8/2014 | Prasad et al. |
| 8,854,997 B2 | 10/2014 | Clow et al. |
| 8,873,496 B2 | 10/2014 | Moulsley et al. |
| 8,929,196 B2 | 1/2015 | Novak et al. |
| 8,948,046 B2 | 2/2015 | Kang et al. |
| 9,007,992 B2 | 4/2015 | Charbit et al. |
| 9,013,974 B2 | 4/2015 | Walton et al. |
| 9,019,068 B2 | 4/2015 | Varoglu |
| 9,037,076 B2 | 5/2015 | Nagata et al. |
| 9,059,753 B2 | 6/2015 | Yang et al. |
| 9,078,187 B2 | 7/2015 | Huh |
| 9,084,261 B2 | 7/2015 | Gholmieh et al. |
| 9,094,145 B2 | 7/2015 | Yue et al. |
| 9,154,198 B2 | 10/2015 | El-najjar et al. |
| 9,154,210 B2 | 10/2015 | Li et al. |
| 9,155,098 B2 | 10/2015 | Geirhofer et al. |
| 9,161,381 B2 | 10/2015 | Lee et al. |
| 9,184,870 B2 | 11/2015 | Sampath et al. |
| 9,191,098 B2 | 11/2015 | Kazmi et al. |
| 9,215,322 B1 | 12/2015 | Wu et al. |
| 9,240,871 B2 | 1/2016 | Walton et al. |
| 9,241,311 B2 | 1/2016 | Sebeni et al. |
| 9,246,651 B2 | 1/2016 | Guo et al. |
| 9,265,053 B2 | 2/2016 | Blankenship et al. |
| 9,288,719 B2 | 3/2016 | Hui et al. |
| 9,306,725 B2 | 4/2016 | Papasakellariou et al. |
| 9,307,489 B2 | 4/2016 | Yerrabommanahalli et al. |
| 9,313,747 B2 | 4/2016 | Zhu et al. |
| 9,337,970 B2 | 5/2016 | Hammarwall et al. |
| 9,338,769 B1 | 5/2016 | Nairn et al. |
| 9,345,037 B2 | 5/2016 | Ode |
| 9,357,472 B2 | 5/2016 | Mukherjee |
| 9,401,750 B2 | 7/2016 | Sayana et al. |
| 9,408,220 B2 | 8/2016 | Gore et al. |
| 9,413,509 B2 | 8/2016 | Chen et al. |
| 9,414,427 B2 | 8/2016 | Yang et al. |
| 9,420,577 B2 | 8/2016 | Kim et al. |
| 9,432,876 B2 | 8/2016 | Ji et al. |
| 9,451,476 B2 | 9/2016 | Shoshan et al. |
| 9,467,909 B2 | 10/2016 | Faerber et al. |
| 9,510,340 B2 | 11/2016 | Kim et al. |
| 9,602,183 B2 | 3/2017 | Kim et al. |
| 9,742,480 B1 | 8/2017 | Nammi et al. |
| 10,027,401 B2 | 7/2018 | Speight et al. |
| 2003/0039217 A1 | 2/2003 | Seo et al. |
| 2003/0043756 A1 | 3/2003 | Reynders et al. |
| 2004/0162048 A1 | 8/2004 | Milbar et al. |
| 2004/0218604 A1 | 11/2004 | Porter |
| 2004/0253955 A1 | 12/2004 | Love et al. |
| 2004/0255040 A1 | 12/2004 | Lopes et al. |
| 2005/0036487 A1 | 2/2005 | Srikrishna |
| 2005/0250506 A1 | 11/2005 | Beale et al. |
| 2006/0240777 A1 | 10/2006 | Ruuska |
| 2007/0110198 A1 | 5/2007 | Skarby et al. |
| 2007/0160156 A1 | 7/2007 | Melzer et al. |
| 2007/0253496 A1* | 11/2007 | Giannakis ............ H04L 1/0041 375/260 |
| 2007/0288618 A1 | 12/2007 | Yeo et al. |
| 2008/0002723 A1 | 1/2008 | Pusateri |
| 2008/0095223 A1 | 4/2008 | Tong et al. |
| 2009/0029645 A1 | 1/2009 | Leroudier |
| 2009/0052448 A1 | 2/2009 | Ramakrishnan et al. |
| 2009/0073922 A1 | 3/2009 | Malladi et al. |
| 2009/0168915 A1 | 7/2009 | Aoki et al. |
| 2009/0262673 A1 | 10/2009 | Hermersdorf |
| 2009/0295623 A1 | 12/2009 | Falk |
| 2010/0002675 A1 | 1/2010 | Fu et al. |
| 2010/0067591 A1 | 3/2010 | Luo et al. |
| 2010/0178057 A1 | 7/2010 | Shieh |
| 2010/0202322 A1 | 8/2010 | Cai et al. |
| 2011/0039495 A1 | 2/2011 | Sawai et al. |
| 2011/0044262 A1 | 2/2011 | Satapathy et al. |
| 2011/0085513 A1 | 4/2011 | Chen et al. |
| 2011/0096727 A1 | 4/2011 | Bergman et al. |
| 2011/0176445 A1 | 7/2011 | Chen |
| 2011/0281579 A1 | 11/2011 | Kummetz |
| 2011/0305161 A1 | 12/2011 | Ekpenyong et al. |
| 2012/0002598 A1 | 1/2012 | Seo et al. |
| 2012/0013564 A1 | 1/2012 | Westhues et al. |
| 2012/0087276 A1 | 4/2012 | Huang et al. |
| 2012/0093109 A1 | 4/2012 | Dong et al. |
| 2012/0147810 A1 | 6/2012 | Wang et al. |
| 2012/0327757 A1 | 12/2012 | Wang et al. |
| 2012/0327794 A1 | 12/2012 | Han et al. |
| 2013/0003604 A1* | 1/2013 | Blankenship ......... H04L 5/0023 370/255 |
| 2013/0028241 A1 | 1/2013 | Wang et al. |
| 2013/0044673 A1 | 2/2013 | Bi et al. |
| 2013/0095748 A1 | 4/2013 | Hu et al. |
| 2013/0301628 A1 | 5/2013 | Dacosta et al. |
| 2013/0155831 A1 | 6/2013 | Kim et al. |
| 2013/0215844 A1 | 8/2013 | Seol et al. |
| 2013/0235808 A1 | 9/2013 | Earnshaw et al. |
| 2013/0242902 A1 | 9/2013 | Liu et al. |
| 2013/0258973 A1 | 10/2013 | Khoshnevis et al. |
| 2013/0336199 A1 | 12/2013 | Schwartz et al. |
| 2013/0337795 A1 | 12/2013 | Falconetti et al. |
| 2014/0010126 A1 | 1/2014 | Sayana et al. |
| 2014/0016534 A1 | 1/2014 | Kim et al. |
| 2014/0044061 A1 | 2/2014 | Yue et al. |
| 2014/0064160 A1 | 3/2014 | Verger et al. |
| 2014/0073339 A1 | 3/2014 | Yang |
| 2014/0086063 A1* | 3/2014 | Wu ..................... H04W 24/00 370/241 |
| 2014/0146754 A1 | 5/2014 | Bayesteh et al. |
| 2014/0189155 A1 | 7/2014 | Morris |
| 2014/0269552 A1 | 9/2014 | Saito |
| 2014/0281670 A1 | 9/2014 | Vasseur et al. |
| 2015/0031284 A1 | 1/2015 | Pitakdumrongkija et al. |
| 2015/0071242 A1 | 3/2015 | Vilaipornsawai et al. |
| 2015/0092695 A1 | 4/2015 | Zhao et al. |
| 2015/0139208 A1 | 5/2015 | Chan et al. |
| 2015/0146655 A1 | 5/2015 | Hui et al. |
| 2015/0155993 A1 | 6/2015 | Berggren et al. |
| 2015/0181534 A1 | 6/2015 | Andersson et al. |
| 2015/0188650 A1 | 7/2015 | Au et al. |
| 2015/0215085 A1 | 7/2015 | Xu et al. |
| 2015/0245272 A1 | 8/2015 | Lindoff et al. |

(56) References Cited

U.S. PATENT DOCUMENTS

| | | |
|---|---|---|
| 2015/0249998 A1 | 9/2015 | Long et al. |
| 2015/0282150 A1 | 10/2015 | Nigam et al. |
| 2015/0326422 A1 | 11/2015 | Sagong et al. |
| 2015/0333878 A1 | 11/2015 | Yu et al. |
| 2015/0334643 A1 | 11/2015 | Maaref et al. |
| 2015/0341093 A1 | 11/2015 | Kwak et al. |
| 2015/0341100 A1 | 11/2015 | Kwak et al. |
| 2015/0349996 A1 | 12/2015 | Vilaipornsawai et al. |
| 2015/0351098 A1 | 12/2015 | Schellmann et al. |
| 2015/0382275 A1 | 12/2015 | Pragada et al. |
| 2016/0006487 A1 | 1/2016 | Ding et al. |
| 2016/0014626 A1 | 1/2016 | Yi et al. |
| 2016/0014762 A1 | 1/2016 | Ji et al. |
| 2016/0028520 A1 | 1/2016 | Nogami et al. |
| 2016/0029359 A1 | 1/2016 | Agiwal et al. |
| 2016/0050039 A1 | 2/2016 | Ma et al. |
| 2016/0080187 A1 | 3/2016 | Yun et al. |
| 2016/0080961 A1 | 3/2016 | Kim et al. |
| 2016/0080963 A1 | 3/2016 | Marinier et al. |
| 2016/0087694 A1 | 3/2016 | Vilaipornsawai et al. |
| 2016/0088521 A1 | 3/2016 | Ho et al. |
| 2016/0119097 A1 | 4/2016 | Nam et al. |
| 2016/0119931 A1 | 4/2016 | Soriaga et al. |
| 2016/0128028 A1* | 5/2016 | Mallik .............. H04W 72/042 370/336 |
| 2016/0128034 A1 | 5/2016 | Choi et al. |
| 2016/0128072 A1 | 5/2016 | Rajagopal et al. |
| 2016/0142117 A1 | 5/2016 | Rahman et al. |
| 2016/0142292 A1 | 5/2016 | Au et al. |
| 2016/0149686 A1 | 5/2016 | Tsai |
| 2016/0154756 A1 | 6/2016 | Dodson et al. |
| 2016/0183242 A1 | 6/2016 | Cordeiro et al. |
| 2016/0191216 A1 | 6/2016 | Ma et al. |
| 2016/0211999 A1 | 7/2016 | Wild et al. |
| 2016/0233938 A1 | 8/2016 | Mondal et al. |
| 2016/0254889 A1 | 9/2016 | Shattil |
| 2016/0255667 A1 | 9/2016 | Schwartz |
| 2016/0262118 A1 | 9/2016 | Kim et al. |
| 2016/0269135 A1 | 9/2016 | Jiang et al. |
| 2016/0269212 A1 | 9/2016 | Vilaipornsawai et al. |
| 2016/0285611 A1 | 9/2016 | Fischer et al. |
| 2016/0294521 A1 | 10/2016 | Au et al. |
| 2016/0301505 A1 | 10/2016 | Furuskog et al. |
| 2016/0352543 A1 | 12/2016 | Hu et al. |
| 2016/0352551 A1 | 12/2016 | Zhang et al. |
| 2016/0353374 A1 | 12/2016 | Höglund et al. |
| 2016/0353420 A1 | 12/2016 | You et al. |
| 2016/0353453 A1 | 12/2016 | Au et al. |
| 2016/0353475 A1 | 12/2016 | Au et al. |
| 2017/0019847 A1 | 1/2017 | Han et al. |
| 2017/0078054 A1 | 3/2017 | Hadani et al. |
| 2017/0078826 A1 | 3/2017 | Cui et al. |
| 2017/0118054 A1 | 4/2017 | Ma et al. |
| 2017/0126299 A1 | 5/2017 | Wei et al. |
| 2017/0126458 A1 | 5/2017 | Shattil |
| 2017/0134205 A1 | 5/2017 | Kim et al. |
| 2017/0163456 A1 | 6/2017 | Chen |
| 2017/0223700 A1 | 8/2017 | Thubert et al. |
| 2017/0237537 A1 | 8/2017 | Nogami et al. |
| 2017/0257238 A1 | 9/2017 | Qian et al. |
| 2017/0257860 A1 | 9/2017 | Nam et al. |
| 2017/0265119 A1 | 9/2017 | Fang |
| 2017/0272210 A1 | 9/2017 | Zhang |
| 2017/0288928 A1 | 10/2017 | Xu et al. |
| 2017/0311188 A1 | 10/2017 | Sun et al. |
| 2017/0325246 A1 | 11/2017 | Agarwal et al. |
| 2017/0331577 A1 | 11/2017 | Parkvall et al. |
| 2017/0367046 A1 | 12/2017 | Papasakellariou |
| 2017/0374558 A1 | 12/2017 | Zhao et al. |
| 2018/0007696 A1 | 1/2018 | Hasarchi et al. |
| 2018/0014320 A1 | 1/2018 | Xu et al. |
| 2018/0035423 A1 | 2/2018 | Wang et al. |
| 2018/0035459 A1 | 2/2018 | Islam et al. |
| 2018/0049233 A1 | 2/2018 | Luo et al. |
| 2018/0049236 A1 | 2/2018 | Sun et al. |
| 2018/0062823 A1 | 3/2018 | Hasegawa |
| 2018/0063818 A1 | 3/2018 | Chen et al. |
| 2018/0092095 A1 | 3/2018 | Zeng et al. |
| 2018/0097598 A1 | 4/2018 | Ang et al. |
| 2018/0167933 A1 | 6/2018 | Yin et al. |
| 2018/0176059 A1 | 6/2018 | Medles et al. |
| 2018/0184410 A1 | 6/2018 | Wilson et al. |
| 2018/0219606 A1 | 8/2018 | Ng et al. |
| 2018/0220400 A1 | 8/2018 | Nogami et al. |
| 2018/0227156 A1 | 8/2018 | Papasakellariou |

FOREIGN PATENT DOCUMENTS

| | | |
|---|---|---|
| CN | 102647386 A | 8/2012 |
| CN | 103391573 A | 11/2013 |
| CN | 104010343 A | 8/2014 |
| CN | 104168620 A | 11/2014 |
| CN | 104486042 A | 4/2015 |
| EP | 0720316 A1 | 7/1996 |
| EP | 1 998 586 A1 | 12/2008 |
| EP | 2 400 674 A2 | 12/2011 |
| EP | 2 858 408 A1 | 4/2015 |
| EP | 3 065 448 A1 | 9/2016 |
| EP | 3160051 A1 | 4/2017 |
| JP | 2011205679 A | 10/2011 |
| JP | 5373076 B2 | 12/2013 |
| WO | 2005064872 A1 | 7/2005 |
| WO | 2008011717 A1 | 1/2008 |
| WO | 2013081628 A1 | 6/2013 |
| WO | 2013107053 A1 | 7/2013 |
| WO | 2013136777 A1 | 9/2013 |
| WO | 2015095844 A1 | 6/2015 |
| WO | 2015108460 A1 | 7/2015 |
| WO | 2015122665 A1 | 8/2015 |
| WO | 2015140601 A1 | 9/2015 |
| WO | 2015186974 A1 | 12/2015 |
| WO | 2016/023207 A1 | 2/2016 |
| WO | 2016026507 A1 | 2/2016 |
| WO | 2016030300 A1 | 3/2016 |
| WO | 2016065068 A3 | 4/2016 |
| WO | 2016068628 A1 | 5/2016 |
| WO | 2016086971 A1 | 6/2016 |
| WO | 2016105120 A1 | 6/2016 |
| WO | 2016128728 A2 | 8/2016 |
| WO | 2016170389 A1 | 10/2016 |

OTHER PUBLICATIONS

ETRI, "Potential CSI-RS and CSI feedback enhancements for EBF/FD-MIMO" 3GPP TSG RAN WG1 Meeting #19 San Francisco. USA, Nov. 11-21, 2014, 6 pages.

International Search Report and Written Opinion for Application No. PCT/US2017/052581 dated Nov. 24, 2017, 18 pages.

Nokia et al., "On System Design for Multiple Numerologies—Initial Access" 3GPP TSG-RAN WG1 #86, Gothenburg, Sweden, Aug. 22-26, 2016, 6 pages.

International Search Report and Written Opinion for Application No. PCT/US2017/052579, dated Jan. 2, 2018, 16 pages.

Qualcomm: "Forward compatibility considerations on NR Integrated Access and Backhaul", 3GPP Draft; R1-167119 3GPP TSG-RAN WG1 #86 Aug. 22-26, 2016, Gothenburg, Sweden, 5 pages.

CATT: "NR Frame Structure Design" 3GPP Draft R1-166472, 3rd Generation Partnership Project (3GPP), Mobile Competence Centre 650, Route Des Lucioles F-06921 Sophia-Antipolis Cedex France, Aug. 21, 2016, 8 pages.

NTT Docomo et al., "Workplan for Study on NR Access Technology" 3GPP Draft; R1-167373 Work Plan for Nr, 3GPP TSG RAN WG1 Meeting #86, Göteborg, Sweden Aug. 22-26, 2016, 30 pages.

Huawei, HiSilicon, AT&T, Samsung, Qualcomm, Ericsson, ASTRI, [ . . . ], "WF on Integrated Backhaul and Access", 3GPP Draft; R1-168429 3GPP TSG RAN WG1 Meeting #86 Gothenburg, Sweden, Aug. 22-26, 2016, 6 pages.

Invitation to Pay Additional Fees and, where Applicable, Protest Fee issued for Application No. PCT/US2017/052578 dated Nov. 30, 2017, 18 pages.

(56) References Cited

OTHER PUBLICATIONS

Acampora et al., "Control and Quality-of-Service Provisioning in High-Speed Microcellular Networks" IEEE Personal Communications, Second Quarter 1994, pp. 34-43.
Graffi et al., "Monitoring and Management of Structured Peer-to-Peer Systems", IEEE P2P'09—Sep. 9-11, 2009, pp. 311-320.
Mogensen et al. "5G small cell optimized radio design." IEEE 2013. http://vbn.aau.dk/files/195969578/Globecom_5G_2013_v16emb.pdf, 2013, 7 pages.
Peng et al. "System architecture and key technologies for 5G heterogeneous cloud radio access networks." IEEE network 29.2 (2015): 614. http://arxiv.org/pdf/1412.6677, 20 pages.
Mogensen et al. "Centimeterwave concept for 5G ultradense small cells." 2014 IEEE 79th Vehicular Technology Conference (VTC Spring). IEEE 2014. http://vbn.aau.dk/ws/files/203990574/MWC2020_v5.pdf, 7 pages.
Li et al. ""Energyoptimal scheduling with dynamic channel acquisition in wireless downlinks."" IEEE Transactions on Mobile Computing 9.4 (2010): 527539. http://wwwbcf.usc.edu/~mjneely/pdf_papers/lineelycdc07.pdf, 8 pages.
Huynh et al "Joint Downlink and Uplink Interference Management for Device to Device Communication Underlaying Cellular Networks." Year: 2016 vol. 4 pp. 4420 4430 DOI:10.1109/ACCESS.2016.2603149 IEEE Journals & Magazines. http://ieeexplore.ieee.org/iel7/6287639/7419931/07552542.pdf, 11 pages.
Jungnickel et al. ""The role of small cells coordinated multipoint and massive MIMO in 5G."" IEEE Communications Magazine 52.5 (2014): 44-51. http://nashville.dyndns.org:823/YourFreeLibrary/_Ite/Small%20Cells/smallCells1.pdf.
Nam et al. "Advanced interference management for 5G cellular networks.""IEEE Communications Magazine 52.5 (2014): 52-60. https://www.researchgate.net/profile/Dongwoon_Bai publication/262416968_Advanced_Interference_Management_for_5G_Cellular_Networks2/ links/5515c7890cf2f7d80a3594b5.pdf", 10 pages.
Guvensen et al. "A Generalized Framework on Beamformer Design and CSI Acquisition for Single-Carrier Massive MIMO Systems in Millimeter Wave Channels." arXiv preprint arXiv:1607.01436 (2016). http://arxiv.org/pdf/1607.01436, 47 pages.
Björnson. "Massive MIMO for 5G." Tutorial at 2015 IEEE International Workshop SPAWC Stockholm Sweden Jun. 29, 2015. https://pdfs.semanticscholar.org/85fc/19cd9a0090c4e32f5520d8edc86b592f5178.pdf, 58 pages.
Yang et al. "Joint Optimization of Transceiver Matrices for MIMO-Aided Multiuser AF Relay Networks: Improving the QoS in the Presence of CSI Errors." IEEE Transactions on Vehicular Technology 65.3 (2016): 1434-1451. http://eprints.soton.ac.uk/375505/1/tvt-hanzo-2410759-proof%20(1).pdf, 38 pages.
Yong et al. "A survey of millimeter wave communications (mmWave) for 5G: opportunities and challenges." Wireless Networks 21.8 (2015): 17 pages.
Miao et al. "Self-organized multi-hop millimeter-wave backhaul network: Beam alignment and dynamic routing." Networks and Communications (EuCNC) 2015 European Conference on. IEEE 2015, 5 pages.
Vijayakumar et al. "Review on Routing Algorithms in Wireless Mesh Networks." International Journal of Computer Science and Telecommunications 3.5 (2012): 8792. http://www.ijcst.org/Volume3/Issue5/p15_3_5_pdf, 6 pages.
Bemmoussat et al."Efficient routing protocol to support qos in wireless mesh network." International Journal of Wireless & Mobile Networks 4.5 (2012): 89. http://search.proquest.com/openview/be6898c2de82656d6aa1ae75b947ede0/1 ?pqorigsite= Gscholar, 16 pages.
Draves et al. "Routing in multiradio multihop wireless mesh networks." Proceedings of the 10th annual international conference on Mobile computing and networking. ACM 2004. http://www.cs.jhu.edu/~cs647/classpapers/ Routing/ p114draves. Pdf, 15 pages.
Wazwaz et al. "Medium Access and Routing in Multi Hop Wireless Infrastructures." Univ. of Twente Enschede the Netherlands (2005). https://www.utwente.nl/ewi/dacs/assignments/completed/master/reports/thesi s_aymanwazwaz.pdf, 91 pages.
Hong, et al. "Applications of selfinterference cancellation in 5G and beyond." IEEE Communications Magazine 52.2 (2014): 114121. http://stevenhong. com/pubs/CommMag145G. pdf, 8 pages.
Hossain. "5G wireless communication systems." American Journal of Engineering Research (AJER) e-ISSN (2013): 2320-0847. http://www.academia.edu/download/32242528/ZP210344353.pdf, 10 pages.
Osseiran, et al. "Scenarios for 5G mobile and wireless communications: the vision of the METIS project." IEEE Communications Magazine 52.5 (2014): 26-35. https://www.metis2020.com/wp-content/uploads/publications / IEEEComMag_Osseiran_et_al_METIS_overview_scenarios_201405.pdf, 20 pages.
Hu, et al. "An energy efficient and spectrum efficient wireless heterogeneous network framework for 5G systems." IEEE Communications Magazine 52.5 (2014): 94-101. http://www.academia.edu/download/34030549 / An_Energy_Efficient_and_Spectrum_Efficient_Wireless_Heterogeneous_Network_Framework_for, 8 pages.
Wu, et al. "Recent advances in energy-efficient networks and their application in 5G systems." IEEE Wireless Communications 22.2 (2015): 145-151. https://www.researchgate.net/profile/Gang_Wu15/publication /275673965_Recent_advances_in_energyefficient_ networks_and_their_application_in_5G_systems/ links/559f3d1508ae03c44a5ce9ac.pdf, 9 pages.
Nakamura, et al. "5G radio access: Requirements, concept and experimental trials." IEICE Transactions on Communications 98.8 (2015): 1397-1406. https://pdfs.semanticscholar.org/68fa/40d96cf347627d2a2875777de3de1fb43223.pdf, 10 pages.
Kim, et al., "Interference Management via Sliding-Window Coded Modulation for 5G Cellular Networks." IEEE Communications Magazine, Nov. 2016, pp. 82-89, vol. 54, Issue 11, 8 pages.
Office Action for U.S. Appl. No. 15/376,137 dated Mar. 23, 2018, 38 pages.
International Search Report and Written Opinion for PCT Application No. PCT/US2017/052578 dated Jan. 22, 2018, 20 pages.
Office Action for U.S. Appl. No. 15/432,515 dated Mar. 30, 2018, 48 pages.
Office Action dated Apr. 5, 2018 for U.S. Appl. No. 15/376,377, 43 pages.
Non-Final Office Action received for U.S. Appl. No. 15/376,209 dated May 1, 2018, 68 pages.
Non-Final Office Action received for U.S. Appl. No. 15/445,760 dated Apr. 30, 2018, 47 pages.
Final Office Action received for U.S. Appl. No. 15/432,515 dated Oct. 29, 2018, 43 pages.
Notice of Allowance received for U.S. Appl. No. 15/445,760 dated Sep. 24, 2018, 29 pages.
Office Action dated Dec. 10, 2018 for U.S. Appl. No. 15/376,209, 37 pages.
Notice of Allowance dated Feb. 25, 2019 for U.S. Appl. No. 15/432,515, 27 pages.
Non-Final Office Action dated Aug. 29, 2019 for U.S. Appl. No. 16/174,854, 48 pages.
Non-Final Office Action received for U.S. Appl. No. 15/376,209 dated May 2, 2019, 40 pages.
Non-Final Office Action received for U.S. Appl. No. 16/186,766 dated Oct. 3, 2019, 64 pages.
Non-Final Office Action received for U.S. Appl. No. 16/238,067 dated Oct. 3, 2019, 60 pages.
Notice of Allowance received for U.S. Appl. No. 15/376,209 dated Nov. 14, 2019, 40 pages.
Notification of Reason for Refusal received for Korean Patent Application Serial No. 10-2019-7009108 dated Jan. 3, 2020, 8 pages (Including English Translation).
Notice of Allowance received for U.S. Appl. No. 16/238,067 dated Feb. 6, 2020, 22 pages.
Communication pursuant to Article 94(3) EPC received for EP Patent Application Serial No. 17778094.7 dated Jan. 30, 2020, 4 pages.

(56) References Cited

OTHER PUBLICATIONS

Communication pursuant to Article 94(3) EPC received for EP Patent Application Serial No. 17778 093.9 dated Feb. 12, 2020, 10 pages.

* cited by examiner

| CQI INDEX | MODULATION | CODE RATE X1024 | EFFICIENCY |
|---|---|---|---|
| 0 | Out of range | Out of range | Out of range |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

| PART 1 | PART 2 |
|---|---|

| INDEX | MODULATION | MOTHER CODE RATE | CONSTRAINT LENGTH | GENERATOR POLYNOMIALS IN OCTAL NOTATIONS |
|---|---|---|---|---|
| 0 | QPSK | 1/2 | 7 | [561, 753] |
| 1 | QPSK | 1/3 | 7 | [561, 753, 715] |
| 2 | QPSK | 1/4 | 7 | [561, 753, 715, 517] |
| 3 | QPSK | 1/6 | 7 | [561, 753, 715, 517, 765] |
| 4 | QPSK | 1/3 | 9 | [561, 753, 715, 517, 765] |
| 5 | 16 QAM | 1/6 | 9 | [561, 753, 715, 517, 765] |
| 6 | 16 QAM | 1/6 | 7 | [561, 753, 715, 517, 765] |
| 7 | 16 QAM | 1/9 | 9 | [561, 753, 715, 517, 765] |

FACILITATING A TWO-STAGE DOWNLINK CONTROL CHANNEL IN A WIRELESS COMMUNICATION SYSTEM

CROSS-REFERENCE TO RELATED APPLICATIONS

This application is a U.S. Non-Provisional Patent Application that claims the benefit of priority to U.S. Provisional Patent Application No. 62/401,867, filed Sep. 29, 2016 and titled "FACILITATING A TWO-STAGE DOWNLINK CONTROL CHANNEL IN A WIRELESS COMMUNICATION SYSTEM," the entirety of which application is incorporated herein by reference.

TECHNICAL FIELD

The subject disclosure relates generally to communications systems, and, for example, to systems, methods and/or machine-readable storage media for facilitating a two-stage downlink control channel for a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

BRIEF DESCRIPTION OF THE DRAWINGS

FIG. 2 illustrates an example, non-limiting 4-bit channel quality index table that can be employed in the two-stage downlink control channel in accordance with one or more embodiments described herein.

FIG. 4 illustrates an example, non-limiting structure to facilitate the two-stage downlink control channel in accordance with one or more embodiments described herein.

FIG. 5 illustrates an example, non-limiting mapping table to facilitate the two-stage downlink control channel in accordance with one or more embodiments described herein.

DETAILED DESCRIPTION

Figure 1:
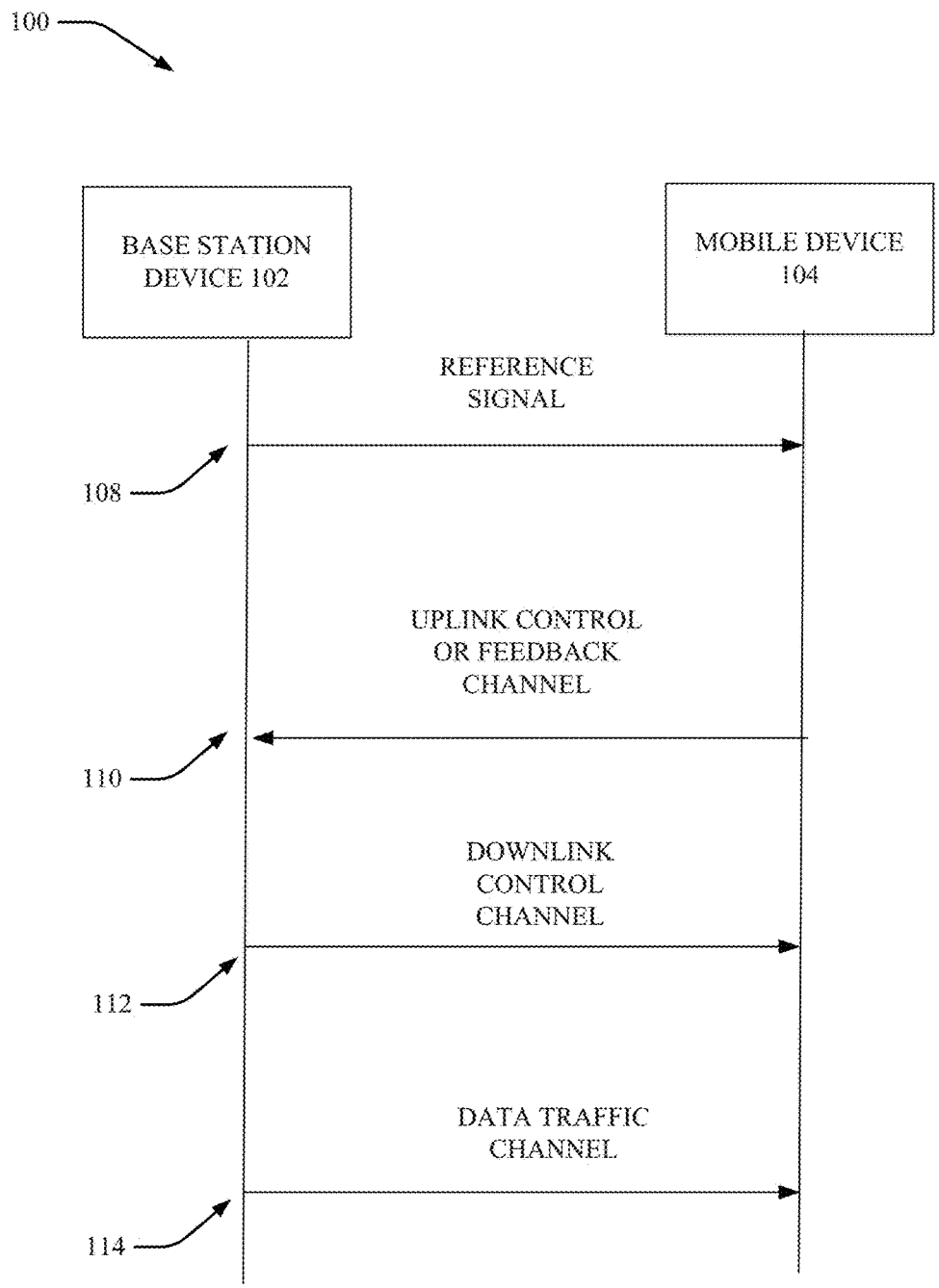
FIG. 1 illustrates an example, non-limiting message sequence flow chart to facilitate a two-stage downlink control channel in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate.

The communication link-system performance can be enhanced with the use of forward error correction codes. When forward error correction is applied to the information block the additional parity bits are added to the information bits. These additional parity bits can protect the information bits when passed through the communication channel from effects of the channel (e.g., Additive White Gaussian Noise (AWGN), multipath fading etc.). Currently, 3GPP is discussing forward error correction codes for control channels, which have short block lengths for 5G systems.

To meet the huge demand for data centric applications, currently 3GPP is looking towards extending the current 4G standards to 5G. However, there are numerous challenges and/or issues that are expected to arise. The communication between the transmitter and the receiver are typically impacted by multipath fading. Link adaptation based on channel conditions can mitigate the impact of fading channels by transmitting robust modulation and/or code rate when the signal is experiencing poor channel conditions and transmitting higher modulation and/or code rate when the signal is experiencing good channel conditions. These approaches can be used in data traffic channels in limited scenarios (e.g., in the 3G and 4G systems).

Unfortunately, this approach cannot be employed for downlink control channels since downlink control channels convey the information about the modulation and code rate for the data traffic channel. The downlink control channel can convey the scheduling information to the mobile device. A conventional downlink control channel is encoded with a fixed modulation and code rate. The output bits are derived from a base code or mother code. Typically, the modulation format for the control channel is always fixed to Quadrature Phase Shift Keying (QPSK) and thus is not flexible to suit the needs that arise with different channel conditions. If link adaptation is to be employed, the mobile device would typically need to do blind decoding of a control channel, which is very cumbersome as the mobile device would have to search all combinations of modulation formats and code rates. This extensive searching can drain the battery and resources and therefore is not viable with existing hardware. As a result, with the existing approaches the control channel cannot typically make use of approaches for link adaptation gains, and a solution applying link adaptation for the control channel is desirable.

As used herein, "5G" can also be referred to as New Radio (NR) access. Accordingly, systems, methods and/or machine-readable storage media for facilitating a two stage control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

One or more embodiments described herein can include systems, apparatus, methods and/or machine-readable storage media that can facilitate a two-stage downlink control channel. In some embodiments, the first part of downlink control channel transmission can be coded with a fixed modulation format that conveys the information about the modulation, code rate that will be useful for the second part of the downlink control channel. As a result, in one or more embodiments, the modulation format and/or code rate in the second part of the downlink control channel can be adaptively changed. In various different embodiments, the second part of the downlink control channel can be adaptively changed based on mobile device feedback received by the BS device and/or based on channel state information detected by the mobile device. In particular, one or more embodiments described herein can comprise a two-stage transmission of a control channel such that modulation format, code rate and/or tail biting convolutional code parameters (e.g., constraint length, polynomials for the convolutional encoder and decoder) are adapted according to the channel conditions thereby efficiently using the transmission resources. As such, one or more embodiments can facilitate providing link adaptation gains to control channels thereby increasing the coverage and/or the capacity of 5G wireless systems. Since this design is efficient in terms of power and resources, the power and resources required for transmitting downlink control channel can be reduced and/or minimized thereby providing the opportunity to use the saved power for data transmission. In this manner, improved data transmission power and resources as well as the link and system throughput can be improved significantly.

Accordingly, link adaption gains can be applied to the downlink control channel. Since power can be optimized, less transmit power is employed for transmitting the downlink control channel. Since the mother code rate polynomials are adapted, according to the code rate, in one or more embodiments, there is improved coverage for the downlink control channel.

In one embodiment, an apparatus is provided. The apparatus can comprise: a processor; and a memory that stores executable instructions that, when executed by the processor, facilitate performance of operations. The operations can comprise: transmitting a first portion of a downlink control channel to a mobile device according to a first specification of parameters; and transmitting a second portion of the downlink control channel to the mobile device according to a second specification of the parameters, wherein the second specification of the parameters is adaptively determined based on a condition of an environment in which the first portion of the downlink control channel is transmitted and wherein the second portion is dictated by the first specification of parameters.

In another embodiment, another apparatus is provided. The apparatus can comprise: a processor; and a memory that stores executable instructions that, when executed by the processor, facilitate performance of operations. The operations can comprise: transmitting a first portion of a downlink control channel to a mobile device according to a first specification of parameters; and transmitting a second portion of the downlink control channel to the mobile device according to a second specification of the parameters, wherein the second specification of the parameters is adaptively determined based on a level of resources for the downlink control channel.

In another embodiment, a method is provided. The method can comprise: determining, by the device, modulation schemes, for modulation of the downlink control channel; and transmitting, by the device, at least a portion of the downlink control channel information employing a first one of the code rates and a first one of the polynomial information based on a condition of an environment that is present when the downlink control channel is to be transmitted, wherein the device is configured to update the code rates and polynomial information in response to an update condition being determined to be satisfied.

FIG. 1 illustrates an example, non-limiting message sequence flow chart to facilitate a two-stage downlink control channel in accordance with one or more embodiments described herein. One or more of reference signals and/or pilot signals can be transmitted as shown at 108 of FIG. 1. The reference signals and/or the pilot signals can be beamformed or non-beamformed. The mobile device 104 can compute the channel estimates then determine the one or more parameters needed for channel state information (CSI) reporting. The CSI report can comprise example channel quality indicator (CQI), preceding matrix index (PMI), rank information (RI), the best subband indices, best beam indices etc. or any number of other types of information.

The CSI report can be sent from the mobile device 104 to the BS device via a feedback channel (e.g., feedback channel 110). The BS device 102 scheduler can use this information in choosing the parameters for scheduling of the particular mobile device 104. As used herein, the term "BS device 102" can be interchangeable with (or include) a network, a network controller or any number of other network components. The mobile device 104 can send the scheduling parameters to the mobile device 104 in the downlink control channel (e.g., downlink control channel 112). After this information is transmitted, the actual data transfer can be provided from the BS device 102 to the mobile device 104 over the data traffic channel 114.

FIG. 2 illustrates an example, non-limiting 4-bit channel quality index (CQI) table that can be employed in the two-stage downlink control channel in accordance with one or more embodiments described herein. The BS device 102 can configure a table such as the CQI table and the mobile device 104 can report a CQI index from the CQI table. This report from the mobile device 104 can be employed to report channel statistics information to the BS device 102.

In one or more embodiments, the downlink control channel can carry information about the scheduling grants providing transmission to and/or from the mobile device 104. Typically this can comprise a number of multiple input multiple output (MIMO) layers scheduled, transport block sizes, modulation for each codeword, parameters related to Hybrid Automatic Repeat Request (HARQ), sub band locations and also precoding matrix index corresponding to the sub bands. Typically, the information transmitted via downlink control information (DCI) format can include, but is not limited to, localized/distributed virtual resource block (VRB) assignment flag; resource block assignment; modulation and coding scheme; HARQ process number; new data indicator; redundancy version; transmission power control (TPC) command for uplink control channel; downlink assignment index; precoding matrix index; and/or number of layers.

Figure 3:
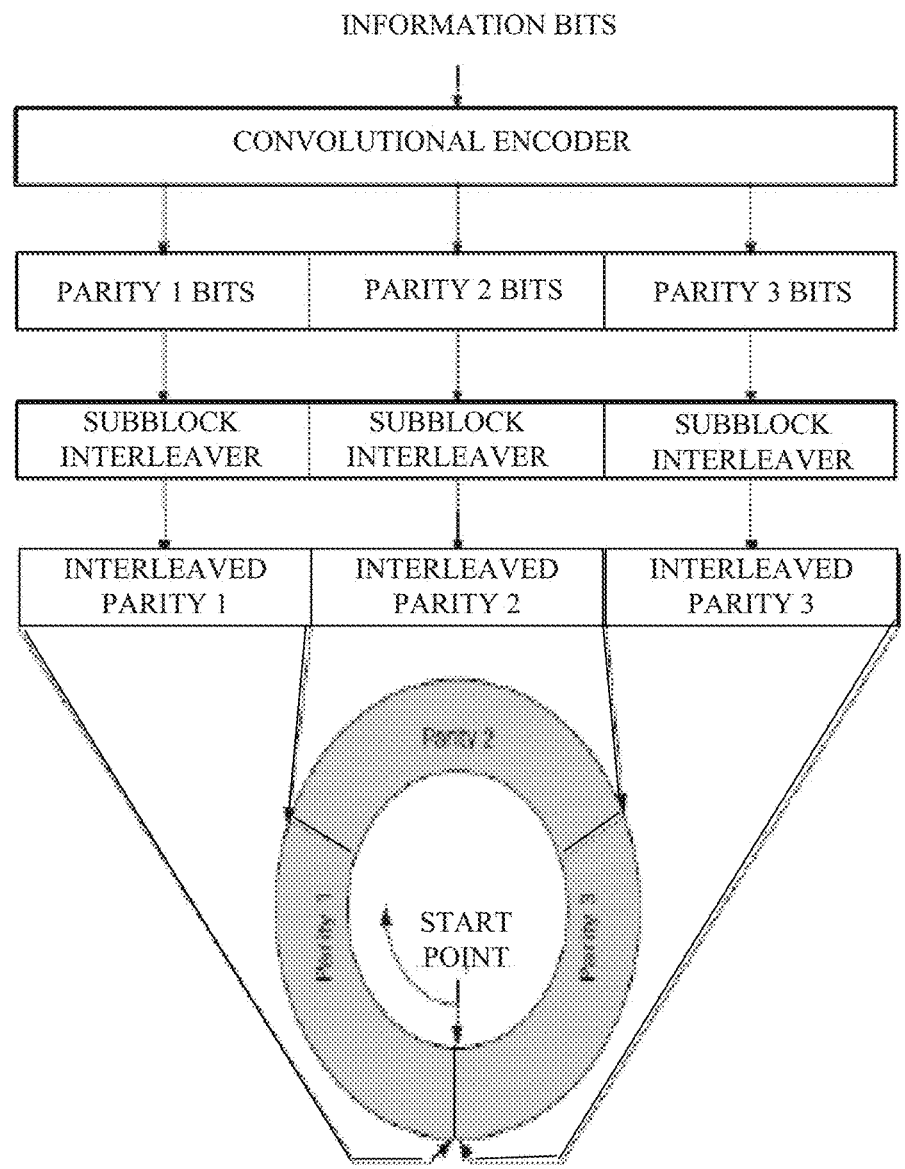
FIG. 3 illustrates an example, non-limiting encoding diagram for a legacy control channel and which can be employed in the two-stage downlink control channel in accordance with one or more embodiments described herein.

FIG. 3 illustrates an example, non-limiting encoding diagram for a legacy control channel and which can be employed in the two-stage downlink control channel in accordance with one or more embodiments described herein. In particular, shown is the encoding of downlink control channel in legacy systems such as LTE. The information bits are encoded with a tail biting convolutional encoder with mother code rate of 1/3. The coded bits can be interleaved and pass through a circular buffer. Based on the resources available for transmission of downlink control channel, the output bits can be rate matched from the circular buffer. The encoded bits can be modulated with a fixed modulation QPSK. The symbols can pass to the orthogonal frequency division multiplexing (OFDM) modulator and the transmission can then take place.

FIG. 4 illustrates an example, non-limiting structure to facilitate the two-stage downlink control channel in accordance with one or more embodiments described herein. As shown, a frame or sub-frame within the downlink control channel 404 can comprise two portions 402, 404. In some embodiments, the first portion 402 can be comprised of fewer symbols than the second portion 404. In some embodiments, the symbols can be OFDM symbols. For example, the entirety of sub-frame or frame can be comprised of n symbols. The first portion 402 can be comprised of three symbols and the second portion 404 can be comprised of n-three symbols.

In one or more embodiments, downlink control channel information can be transmitted from the BS device 102 to the mobile device 104 in two steps and/or in two portions of the frame (or the sub-frame). The BS device 102 can populate the first portion 402 with information that is processed/encoded with a fixed modulation scheme, fixed code rate and/or the fixed mother code rate. The first portion 402 can be encoded with a fixed modulation format that is very robust for errors. The second part is encoded with the modulation and code rate indicated by the first part. The BS device 102 can use the channel state information from the mobile device 104 to determine the modulation scheme, code rate and/or the mother encoder parameters.

In some embodiments, in the first portion 402, the BS can indicate the modulation scheme, code rate, mother encoder polynomials, spectral efficiency for the second portion 404 of the control channel. The first portion 402 can be encoded with robust modulation that is fixed and always the same for the first portion of the downlink control channel frame/sub-frame while the second portion 404 can be dynamically encoded and modulated based on the information provided in the first portion 402. The first portion 402 can therefore be encoded and modulated very robustly and the information that is in fact encoded/modulated robustly in the first portion 402 can indicate the manner of handling the encoding and modulation of the second portion 404. In some embodiments, the first portion 402 is part of a frame indicator channel.

Thus, the encoding and modulation of the second portion 404 can be dynamically changed from time to time based on various different information including, but not limited to, channel conditions (as detected by the mobile device 104 via the downlink, as detected on the uplink by the BS device 102) or based on an amount of resources for the control channel. In some embodiments, decisions regarding the parameter can be made in any number of ways: (1) since link adaptation is from the mobile device 104, based on the mobile device 104 sending channel information (and the BS device 102 can infer the type of channel the mobile device is in with regard to the signal to noise ratio (SNR) and state of the channel (this can be a feedback approach); (2) based on the load in which if there is a need for more resources because there is a higher bit rate of data in the load, the BS device 102 can select parameters using a higher modulation rate to free up data; and/or (3) the BS device 102 can determine the SNR or the channel state based on channel uplink measurements. In some embodiments, the BS device 102 can determine the SNR and determine which index of FIG. 5 corresponds to the particular SNR or that corresponds to the type of channel indicated by the SNR.

In various embodiments described herein, rather than fixing the modulation scheme, code rate and/or encoder parameters such as constraint length, polynomials for the tail biting convolutional code, the transmitter of the BS device 102 can choose dynamically based on the channel state information from the receiver at the mobile device 104 thereby adapting these parameters based on channel. However, the control channel is conveying information about the modulation and code rate of the traffic channel, and one or more embodiments described herein can divide or separate the control channel into two portions 402, 404 as shown in FIG. 4. The first portion 402 can convey information about the number of OFDM symbols, modulation, code rate and the convolutions code parameters (e.g., constraint length, generator polynomials etc.) for the second portion.

The first portion 402 can be encoded with a robust modulation format and robust encoding scheme that is fixed and known to the transmitter of the BS device 102 and the receiver of the mobile device 104. For example, the existing frame indicator channel (e.g., physical control format indicator channel, or PCFICH) signal can be used to transmit the first portion 402. Note that existing frame indicator channel can convey information about the number of OFDM symbols needed for downlink control channel by transmitting a defined number of bits (e.g., in one embodiment, two bits encoded by Hadamard code and modulated by QPSK). In some embodiments described herein, the frame indicator channel can be extended to more than two bits to transmit the modulation, code rate, and the convolution code parameters.

For example, in some embodiments, a mapping table can indicate the modulation, code rate, and the convolution code parameters for the second portion 404. As an example, if the BS device 104 determines and/or senses the mobile device 014 is located in an area having a good channel condition, then the BS device can choose index 7 (e.g., 3 bits) and transmit this information in the first portion 402. Hence, the second portion 404 can be encoded with 16 quadrature amplitude modulation (QAM), mother code rate 1/9 with tail biting convolutional code with constraint length 9 and generator polynomials as shown in FIG. 5. FIG. 5 illustrates an example, non-limiting mapping table to facilitate the two-stage downlink control channel in accordance with one or more embodiments described herein.

In one embodiment, the BS device 102 chooses these parameters based on channel state information received from the mobile device 104. In another embodiment, the BS device 102 can choose these parameters based on load. For example, if the BS device 102 has few resources for control channel, then the BS device 102 can use higher modulation to free up the resources as higher modulations are more bandwidth efficient. In another embodiment, the BS device 102 can choose these parameters based on channel measurements in the downlink or uplink for example in a time division duplex (TDD) system the BS device 102 can use reciprocity to decide about these parameters.

In some embodiments, if there are no resources for the control channel (or resources less than a defined amount or type) and the mobile device 104 is experiencing satisfactory channel conditions (e.g., channel conditions having a signal-to-noise ratio greater than or equal to a defined value) then the BS device 102 can employ QPSK. If the mobile device is in an environment having a channel that is not satisfactory (e.g., channel conditions having a signal-to-noise ratio less than a defined value) then the BS device 102 can employ QAM.

In another example, the first three control symbols can be control information that can be evaluated by the mobile device 104. The mobile device 104 can then determine whether various data is intended for the mobile device 104. If the data is intended for the mobile device 104, the mobile device 104 can employ the control information to demodulate, etc. Once the mobile device 104 receives the information, the mobile device 104 can decode the second portion 402 of the control channel and demodulate the actual data transfer based on the specifications/parameters sent in the first portion 402.

Thus, one or more embodiments can exploit link adaptation of a downlink control channel to achieve a gain in the data channel. For example, if the mobile device 104 has a good SNR channel, the BS device 102 can decide to send a higher number of bits for the information (e.g., the information can be the second portion 402 and/or the data transmission)with same power or to send the same number of bits with less power and less resources. If the mobile device has a poor SNR channel, the BS device 102 can decide to send the information (e.g., second portion 402 and/or data transmission) with more power or with a higher code rate. As such, the number and/or particular resources used for the control channel can be adapted based on channel conditions. The resources that are saved can then be used for data transmission and thus, can increase link capacity.

In some embodiments, instead of the downlink control channel transmitting all complete information, the BS can send fewer numbers of bits in the first portion 402 and send with fixed modulation, code rate, etc. (e.g., using the Physical Control Format Indication Channel (PFICH) channel in some embodiments). In some embodiments, the table of FIG. 5 (or information from the table in FIG. 5) can also be sent to the mobile device 104. The mobile device 104 can choose index within the table of FIG. 5. In some embodiments, the information in the first portion 402 can indicate the encoding parameters (and other parameters, such as modulation scheme, polynomials, constraint length for the second portion 404. As such, the second portion 404 is the actual control channel that sends all of the information.

Thus, one or more embodiments can provide link adaptation of the control channel in a second portion 404 of the control channel based on the information that was detected in the first portion 402 of the control channel. Additionally and/or alternatively, one or more embodiments can, as a separate point of novelty, change one or more parameters used for the control channel (e.g., providing the flexibility to select between multiple different code rates (e.g., 1/3, 1/6, 1/5), polynomials and/or modulation schemes and/or constraint lengths for the control channel thereby improving significantly on the convolutional encoder in the physical layer of the system prior to transmission.

Figure 6:
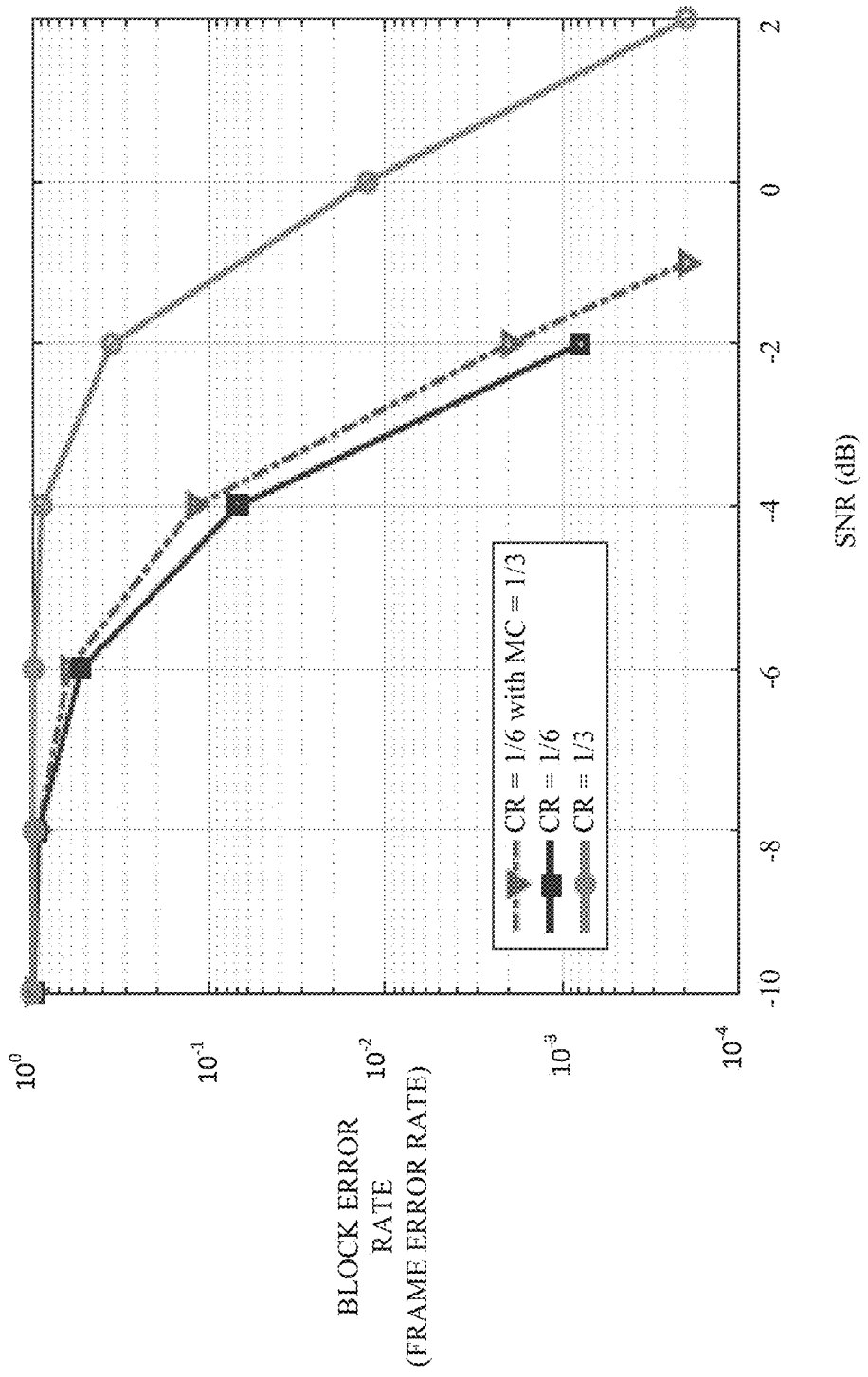
FIGS. 6, 7 and 8 are graphs illustrating frame error rate (FER) performance employing the two-stage downlink control channel in accordance with one or more embodiments described herein.
Figure 7:
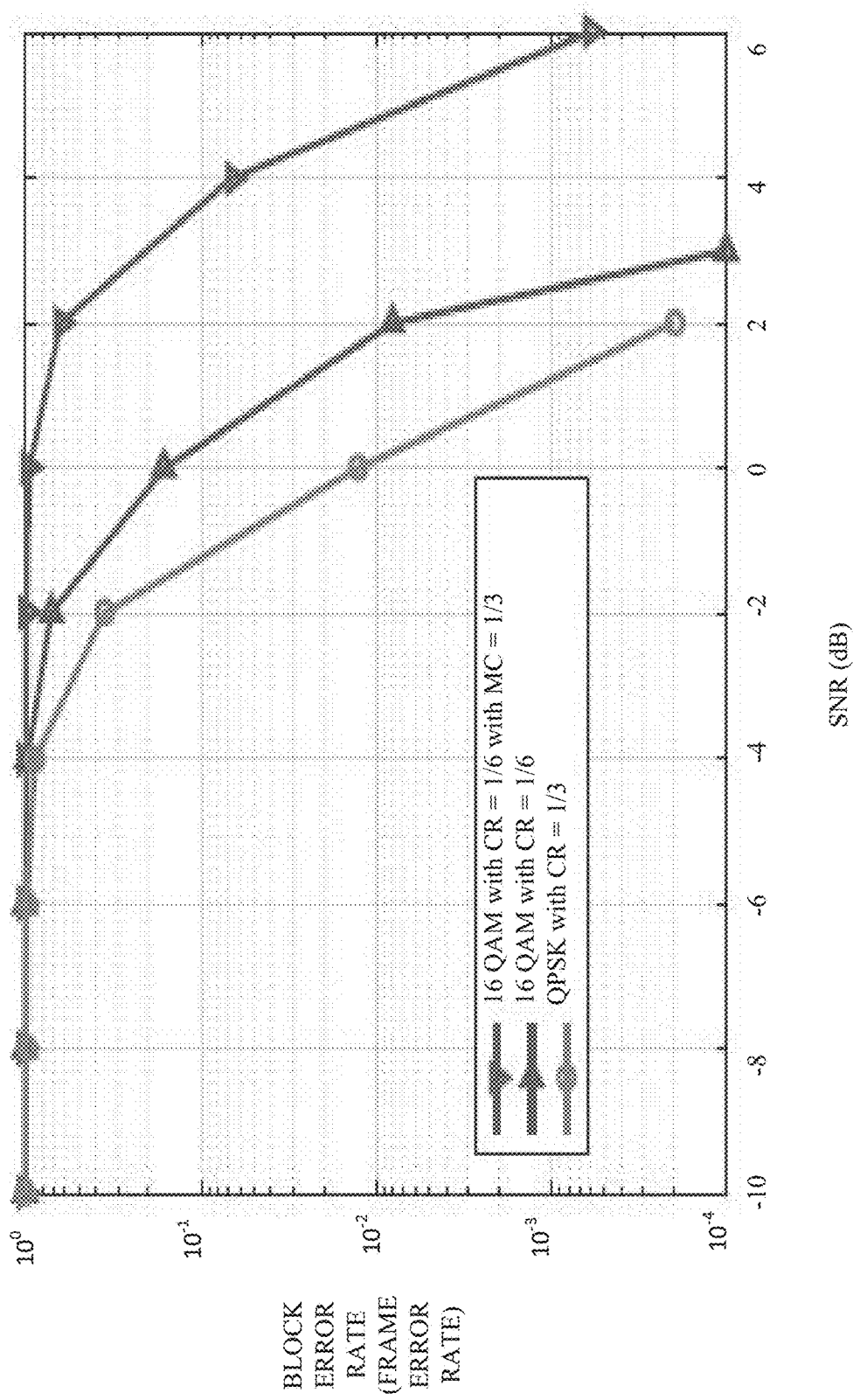
Figure 8:
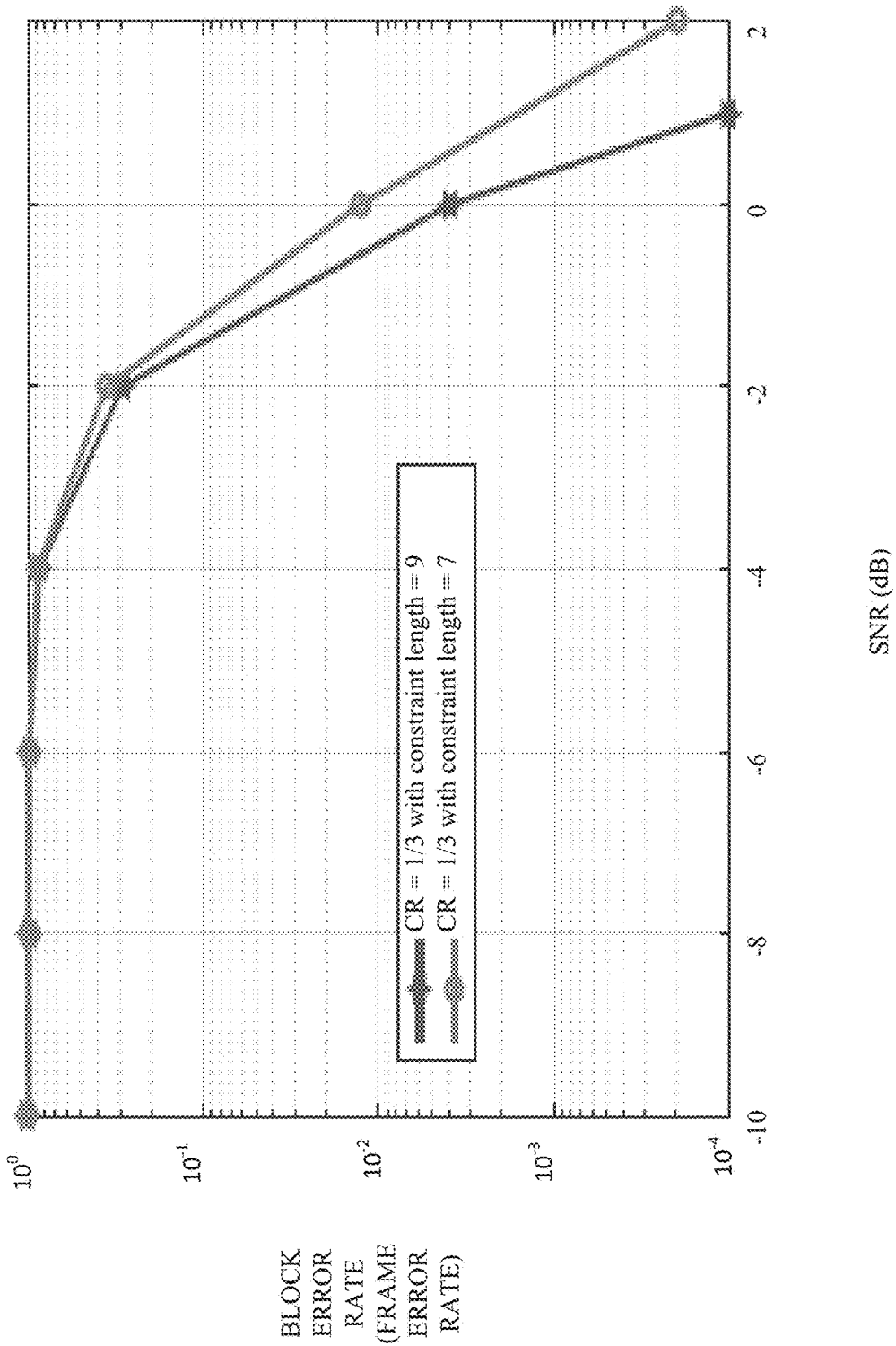

FIGS. 6, 7 and 8 are graphs illustrating FER performance employing the two-stage downlink control channel in accordance with one or more embodiments described herein. Turning first to FIG. 6, shown is FER performance for code rates 1/6 and a generator polynomial of 1-6 is employed rather than using 1/mother code with rate matching. As shown, the performance can be enhanced by employing individual polynomials. As also shown, the performance of code rate (CR) 1/6 is better than the performance of CR 1/3.

Now turning to FIG. 7, shown is an FER performance with 16 QAM. As shown, performance is improved significantly by using individual polynomials optimized for rate 1/6 while at the same time resources can be reduced by half. Hence, when the network uses 16 QAM with an optimized polynomial for this rate, resources can be saved.

Now turning to FIG. 8, shown is an FER performance with higher constraint length of 9 (and constraint length of 7). As shown, performance can be improved significantly with a higher constraint length. Hence, the network can instruct the mobile device (e.g., via mapping table) with poor channel conditions to use a higher constraint length to improve the performance.

In some embodiments, the first portion of the downlink control channel 112 can also indicate a search space of the second portion of downlink control channel 112. In some embodiments, the first portion of the downlink control channel 112 is transmitted in a cell specific manner to indicate an index of a transmission format for the second portion of the downlink control channel 112. The transmission format can include the modulation scheme, the code rate and the search space, and can be configured in a mobile device specific manner. As such, the first portion of the downlink control channel 112 can indicate an index (e.g., cell specific), and that particular index can be employed to identify a transmission format configured to each mobile device. For example, for the same index, the mobile device can have a different understanding/corresponding action for the detailed transmission format.

Figure 9:
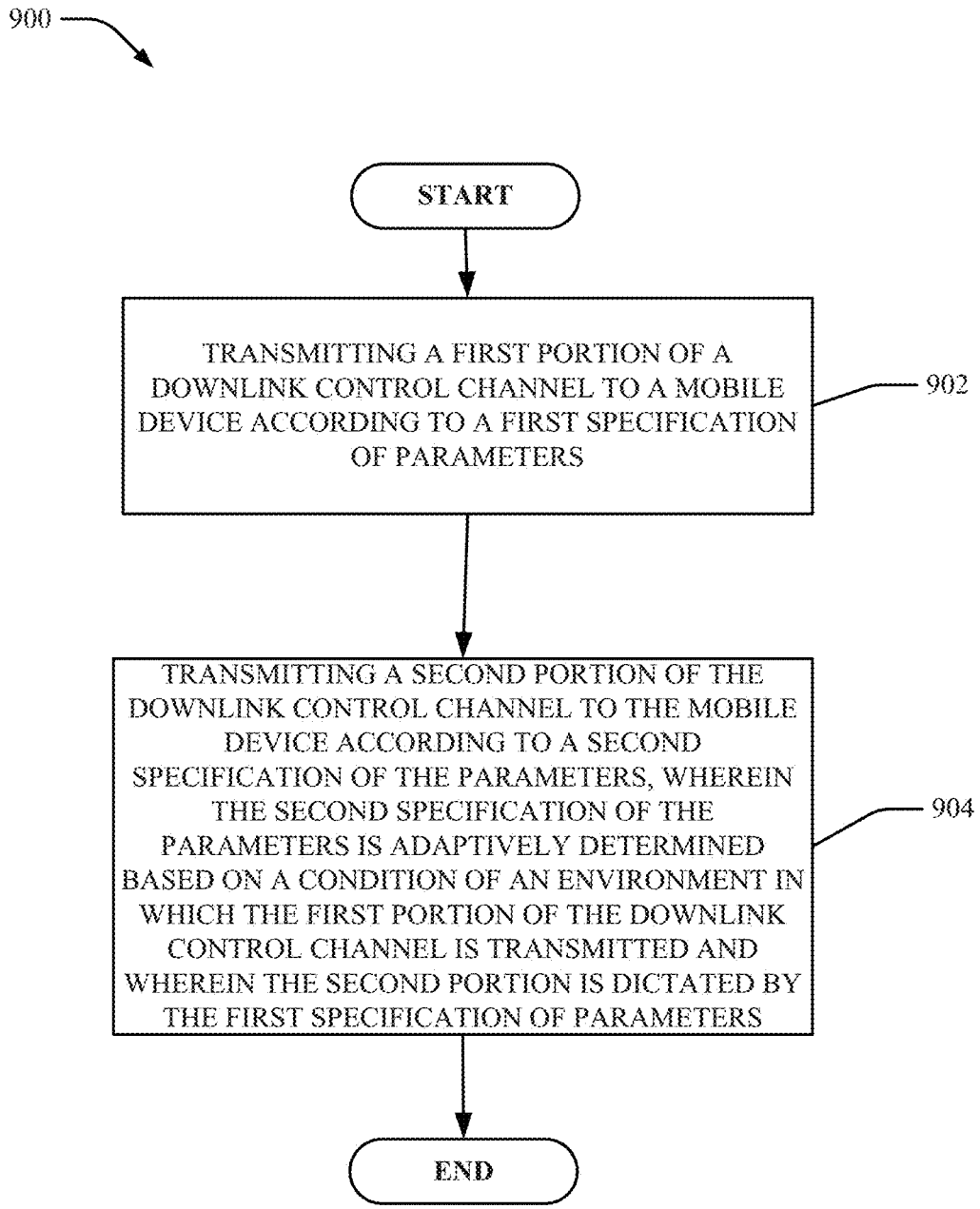
FIGS. 9, 10 and 11 illustrate flowcharts of methods that facilitate a two-stage downlink control channel in accordance with one or more embodiments described herein.
Figure 10:
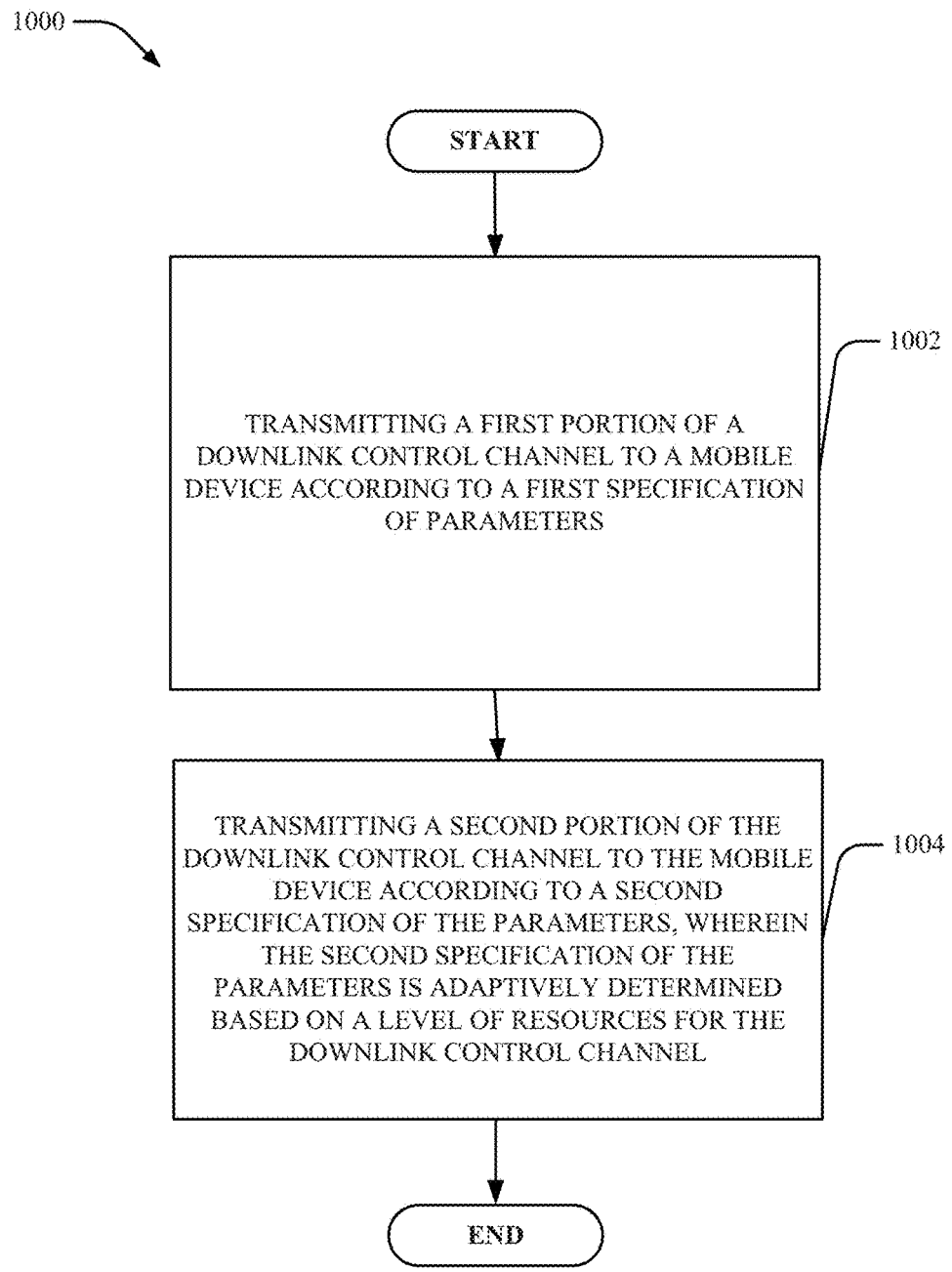
Figure 11:
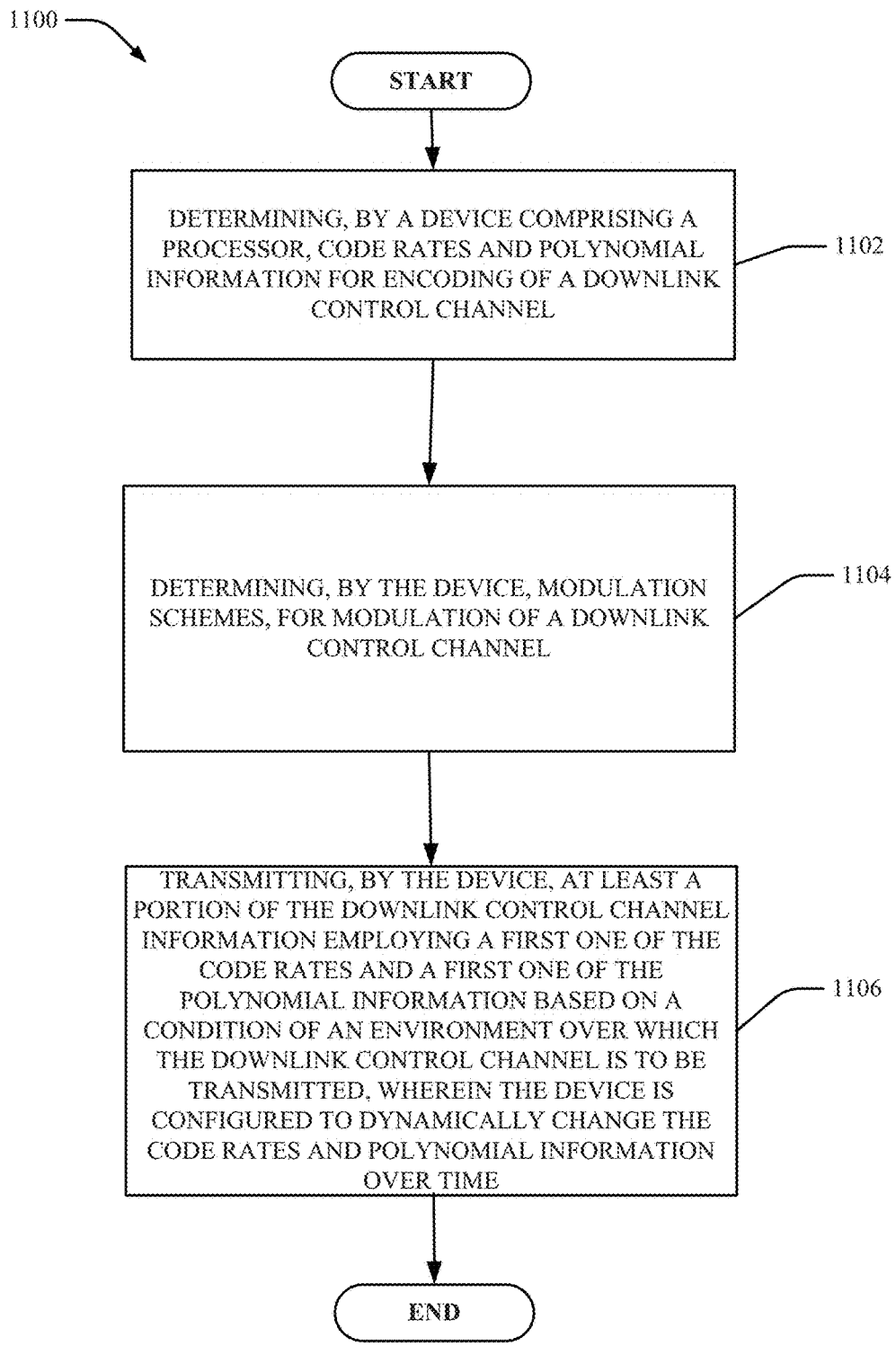

FIGS. 9, 10 and 11 illustrate flowcharts of methods that facilitate a two-stage downlink control channel in accordance with one or more embodiments described herein. At 902, method 900 can comprise transmitting a first portion of a downlink control channel to a mobile device according to a first specification of parameters. In some embodiments, the first specification of the parameters is fixed irrespective of the condition of the environment in which the first portion of the downlink control channel is transmitted. In various embodiments, the parameters can comprise, but are not limited to, modulation scheme, code rate, constraint length and/or polynomial information.

In some embodiments, the first specification of the parameters is known a priori to the apparatus and a receiver at the mobile device, wherein the first specification of the parameters is associated with a first type of modulation scheme and a first code rate and wherein the second specification of the parameters is associated with a second type of modulation scheme and a second code rate. In some embodiments, wherein the second specification of the parameters comprises a first modulation type based on a determination that a signal-to-noise ratio of the channel satisfies a defined condition and wherein the second specification of the parameters comprises a second modulation type based on a determination that the signal-to-noise ratio of the channel fails to satisfy the defined condition.

At 904, method 900 can comprise transmitting a second portion of the downlink control channel to the mobile device according to a second specification of the parameters, wherein the second specification of the parameters is adaptively determined based on a condition of an environment in which the first portion of the downlink control channel is transmitted and wherein the second portion is dictated by information in the first portion (e.g., the first specification of parameters). In some embodiments, the downlink control channel comprises a downlink control channel configured to operate according to the 5G wireless communication protocol.

In some embodiments, although not shown, method 900 also comprises determining the condition of the environment in which the first portion of the downlink control channel is transmitted, wherein the determining is based on channel state information feedback from the mobile device.

In some embodiments, although not shown, method 900 can also comprise determining the condition of the environment in which the first portion of the downlink control channel is transmitted, wherein the determining is based uplink channel information measured by the base station device.

Turning now to FIG. 10, at 1002, method 1000 can comprise transmitting a first portion of a downlink control channel to a mobile device according to a first specification of parameters. In some embodiments, the first specification of the parameters is fixed regardless of a condition of the environment in which the first portion of the downlink control channel is transmitted.

At 1004, method 1000 can comprise transmitting a second portion of the downlink control channel to the mobile device according to a second specification of the parameters, wherein the second specification of the parameters is adaptively determined based on a level of resources for the downlink control channel. In some embodiments, the second specification of the parameters employs a first modulation greater than a modulation threshold based on the level of resources being determined to be below a defined threshold and employing a second modulation less than the modulation threshold based on the level of resources being determined to be greater than the defined threshold.

Turning now to FIG. 11, at 1102, method 1100 can comprise determining, by a device comprising a processor, code rates and polynomial information for encoding of a downlink control channel. In some embodiments, the device is configured to operate according to a protocol that provides data rates of several tens of megabits per second for tens of thousands of other devices. In some embodiments, the device is configured to operate according to a protocol that provides data rates of several tens of megabits per second for tens of thousands of other devices.

In some embodiments, although not shown, the method 1100 can also comprise transmitting, by the device, at least the portion of the downlink control channel information employing a first one of the modulation schemes.

At 1104, method 1100 can comprise determining, by the device, modulation schemes, for modulation of a downlink control channel.

At 1106, method 1100 can comprise transmitting, by the device, at least a portion of the downlink control channel information employing a first one of the code rates and a first one of the polynomial information based on a condition of an environment over which the downlink control channel is to be transmitted, wherein the device is configured to dynamically change the code rates and polynomial information over time.

Figure 12:
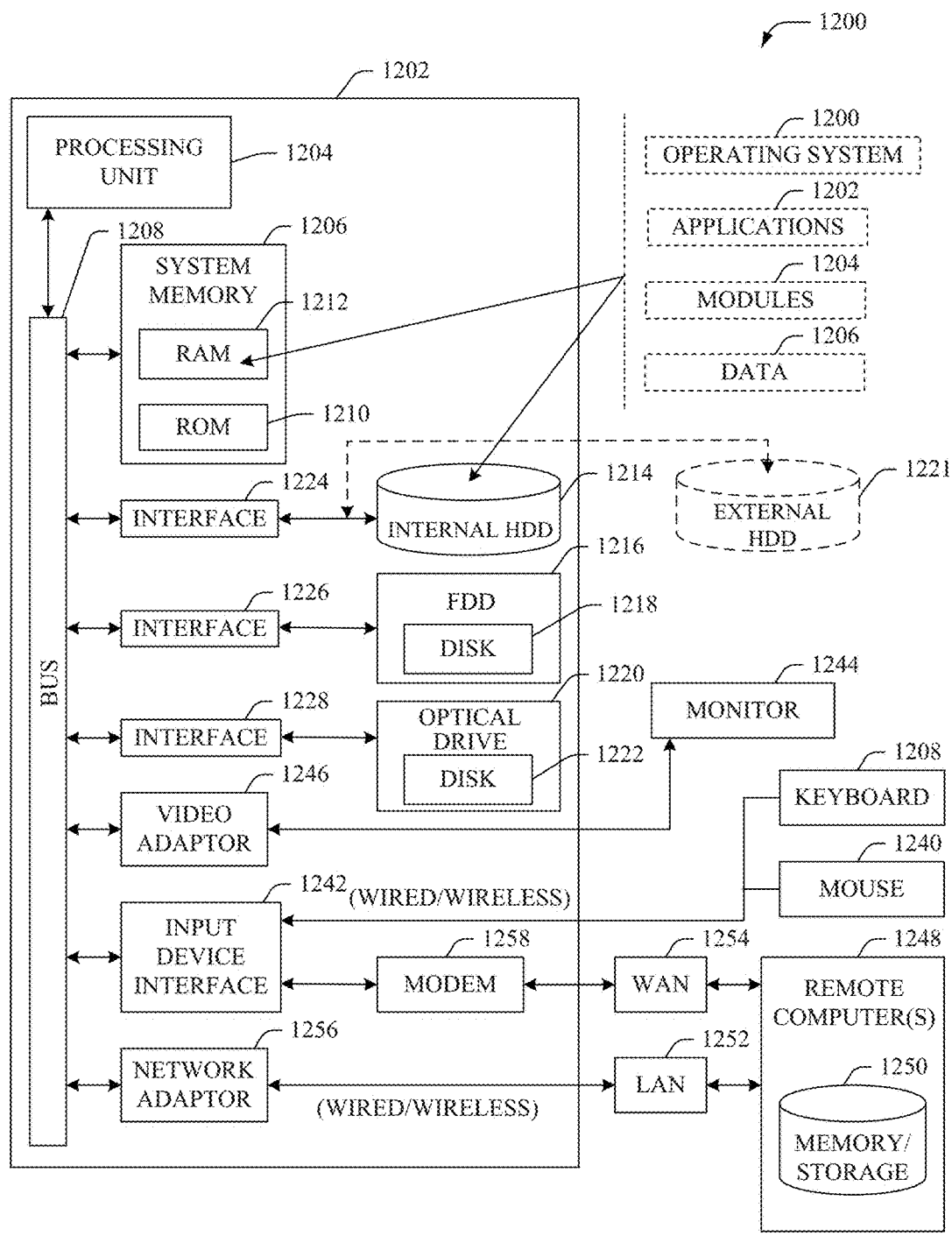
FIG. 12 illustrates a block diagram of a computer that can be employed in accordance with one or more embodiments described herein.

FIG. 12 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104).

In order to provide additional text for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various embodiments of the embodiments described herein comprises a computer 1202, the computer 1202 comprising a processing unit 1204, a system memory 1206 and a system bus 1208. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1210 (e.g., EIDE, SATA), which internal hard disk drive 1214 can also be configured for external use in a suitable chassis (not shown), a magnetic floppy disk drive 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface, respectively. The interface 1224 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1202, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A communication device can enter commands and information into the computer 1202 through one or more wired/wireless input devices, e.g., a keyboard 1238 and a pointing device, such as a mouse 1240. Other input devices (not shown) can comprise a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically comprises other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
 a processor; and
 a memory that stores executable instructions that, when executed by the processor, facilitate performance of operations, comprising:
  transmitting a first portion of a downlink control channel to a mobile device according to a first specification of parameters; and
  transmitting a second portion of the downlink control channel to the mobile device according to a second specification of the parameters, wherein the second specification of the parameters is adaptively determined based on a channel condition in which the first portion of the downlink control channel is transmitted,
  wherein the first specification of the parameters is associated with a first type of modulation scheme and a first code rate, wherein the first type of modulation scheme and the first code rate are static irrespective of the channel condition in which the first portion of the downlink control channel is transmitted,
  wherein the second specification of the parameters is associated with a second type of modulation scheme, a second code rate and a search space, wherein the second type of modulation scheme, the second code rate and the search space are dynamically determined depending on the channel condition and the first specification of parameters.

2. The apparatus of claim 1, wherein the operations further comprise determining the channel condition in which the first portion of the downlink control channel is transmitted, and wherein the determining is based on channel state information feedback from the mobile device.

3. The apparatus of claim 1, wherein the operations further comprise determining the channel condition in which the first portion of the downlink control channel is transmitted.

4. The apparatus of claim 3, wherein the determining is based on uplink channel information measured by the apparatus.

5. The apparatus of claim 1, wherein the first specification of the parameters is known a priori to the apparatus and a receiver at the mobile device.

6. The apparatus of claim 1, wherein the second specification of the parameters is based on a determination that a signal-to-noise ratio of the channel fails to satisfy a defined condition.

7. The apparatus of claim 1, wherein the downlink control channel comprises a downlink control channel configured to operate according to a Fifth Generation wireless communication protocol.

8. The apparatus of claim 1, wherein the parameters comprise a modulation scheme.

9. The apparatus of claim 1, wherein the parameters comprise a code rate.

10. The apparatus of claim 1, wherein the parameters comprise a constraint length or a search space.

11. The apparatus of claim 10, wherein the search space corresponds to a group of radio resources to be monitored for control channel reception.

12. The apparatus of claim 1, wherein the parameters comprise polynomial information.

13. An apparatus, comprising:
 a processor; and
 a memory that stores executable instructions that, when executed by the processor, facilitate performance of operations, comprising:
  transmitting a first portion of a downlink control channel to a mobile device according to a first specification of parameters; and
  transmitting a second portion of the downlink control channel to the mobile device according to a second specification of the parameters, wherein the second specification of the parameters is adaptively determined based on a level of resources for the downlink control channel,
  wherein the first specification of the parameters is associated with a first type of modulation scheme and a first code rate, wherein the first type of modulation scheme and the first code rate are static irrespective of a channel condition in which the first portion of the downlink control channel is transmitted,
  wherein the second specification of the parameters is associated with a second type of modulation scheme, a second code rate and a search space, wherein the second type of modulation scheme, the second code rate and the search space are adaptively determined based on the channel condition and the first specification of parameters.

14. A method, comprising:
 determining, by a device comprising a processor, code rates and polynomial information for encoding of a downlink control channel;
 determining, by the device, modulation schemes, for modulation of the downlink control channel; and
 transmitting, by the device, at least a portion of information via the downlink control channel, wherein the information includes a first one of the code rates and a first one of the polynomial information, wherein the device is configured to update the code rates and polynomial information in response to an update condition being determined to be satisfied,
  wherein the first one of the code rates and the first one of the polynomial information are static irrespective of a channel condition in which at least the portion of the downlink control channel information is transmitted, and
  wherein a second code rate and a search space are determined as a function of the channel condition, the first one of the code rates, and the first one of the polynomial information.

15. The method of claim 14, wherein the transmitting at least the portion of the downlink control channel information comprises:
 transmitting at least the portion of the downlink control channel information employing a modulation scheme of the modulation schemes.

16. The method of claim 15, wherein the modulation scheme of the modulation schemes is a quadrature amplitude modulation scheme.

17. The method of claim 15, wherein the modulation scheme of the modulation schemes is a quadrature phase shift keying modulation scheme.

18. The method of claim 14, wherein the device is a first device configured to operate according to a protocol that provides data rates.

19. The method of claim 18, wherein the data rates are of several tens of megabits per second for tens of thousands of other devices.

20. The method of claim 14, wherein at least the portion of the downlink control channel information comprises a first three orthogonal frequency division multiplexed symbols of a group of 14 symbols in an orthogonal frequency division multiplexed symbol sub-frame.

* * * * *